US012675247B2

(12) United States Patent
Yoshikawa

(10) Patent No.: US 12,675,247 B2
(45) Date of Patent: Jul. 7, 2026

(54) IMAGE PROCESSING APPARATUS, IMAGE PROCESSING SYSTEM, NON-TRANSITORY COMPUTER READABLE MEDIUM STORING IMAGE PROCESSING PROGRAM, AND IMAGE PROCESSING METHOD

(71) Applicant: FUJIFILM Business Innovation Corp., Tokyo (JP)

(72) Inventor: Satoshi Yoshikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/190,073

(22) Filed: Mar. 25, 2023

(65) Prior Publication Data

US 2024/0094963 A1 Mar. 21, 2024

(30) Foreign Application Priority Data

Sep. 15, 2022 (JP) ................................. 2022-147301

(51) Int. Cl.
*G06F 3/12* (2006.01)
(52) U.S. Cl.
CPC ............ *G06F 3/125* (2013.01); *G06F 3/1205* (2013.01)
(58) Field of Classification Search
None
See application file for complete search history.

(56) References Cited

U.S. PATENT DOCUMENTS

| | | | | |
|---|---|---|---|---|
| 6,009,303 | A * | 12/1999 | Kumagai ........... | H04N 1/00681 |
| | | | | 399/370 |
| 9,378,189 | B2 * | 6/2016 | Nakagawa ............ | G06F 40/106 |
| 9,495,122 | B2 * | 11/2016 | Nakagoshi ............. | H04N 1/387 |
| 9,769,351 | B2 * | 9/2017 | Li ......................... | H04N 1/3878 |
| 2011/0164283 | A1 * | 7/2011 | Sadasue ............... | H04N 1/3875 |
| | | | | 358/1.18 |
| 2012/0188567 | A1 * | 7/2012 | Sheng .................. | H04N 1/0044 |
| | | | | 358/1.9 |
| 2015/0324954 | A1 * | 11/2015 | Palanivel .................. | G06T 3/60 |
| | | | | 358/474 |
| 2022/0375259 | A1 * | 11/2022 | Banerjee ................ | G06V 40/45 |
| 2023/0105171 | A1 * | 4/2023 | Beye ................... | G06F 21/6254 |
| | | | | 713/193 |

FOREIGN PATENT DOCUMENTS

JP 2011142466 7/2011

* cited by examiner

*Primary Examiner* — Helen Zong
(74) *Attorney, Agent, or Firm* — JCIPRNET

(57) ABSTRACT

An image processing apparatus includes a processor configured to: acquire a document image sequence including plural document images obtained by scanning plural documents; and arrange and output a document image on each page such that the document image is a boundary of pages matched to a repetition cycle of a document size in a case where there is the repetition cycle in the document image sequence.

10 Claims, 11 Drawing Sheets

1

IMAGE PROCESSING APPARATUS, IMAGE PROCESSING SYSTEM, NON-TRANSITORY COMPUTER READABLE MEDIUM STORING IMAGE PROCESSING PROGRAM, AND IMAGE PROCESSING METHOD

CROSS-REFERENCE TO RELATED APPLICATIONS

This application is based on and claims priority under 35 USC 119 from Japanese Patent Application No. 2022-147301 filed Sep. 15, 2022.

BACKGROUND

(i) Technical Field

The present disclosure relates to an image processing apparatus, an image processing system, a non-transitory computer readable medium storing an image processing program, and an image processing method.

(ii) Related Art

JP2011-142466A proposes an image processing apparatus including: an image data receiving unit that receives image data scanned by an image forming apparatus connected via a network and records the image data in an image data storage unit; a layout generating unit that generates a layout of a plurality of images included in the image data recorded in the image data storage unit for a predetermined arrangement area; a layout image generating unit that generates layout image data in which the images are arranged according to the layout in a case where the layout satisfies a predetermined condition; and a print control unit that causes the image forming apparatus to print the layout image data.

SUMMARY

In a case where a plurality of document images are scanned and the scanned document images are arranged in the order of scanning and a number that can be arranged on one page is arranged, the arrangement expected by a user may not be obtained. For example, in a case where there is a repetition cycle in the size of a document and it is intended to output one repetition cycle as one unit, the expected arrangement is not obtained in a case where the document images that can be arranged on one page are arranged.

Aspects of non-limiting embodiments of the present disclosure relate to an image processing apparatus, an image processing system, a non-transitory computer readable medium storing an image processing program, and an image processing method capable of outputting a document image in an arrangement according to a repetition cycle in a case where there is the repetition cycle in the size of a document.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including a processor configured to: acquire a document image sequence including a plurality of document images obtained by scanning a plurality of documents; and arrange and output a document image on each page such that the document image is a boundary of pages matched to a repetition cycle of a document size in a case where there is the repetition cycle in the document image sequence.

BRIEF DESCRIPTION OF THE DRAWINGS

Exemplary embodiment(s) of the present invention will be described in detail based on the following figures, wherein:

FIG. 4 is a diagram illustrating an arrangement example of a plurality of document images in the image forming apparatus according to the present exemplary embodiment;

FIG. 5 is a diagram illustrating an arrangement example in a case where the number of document images for one cycle does not fit on one page;

DETAILED DESCRIPTION

Figure 1:
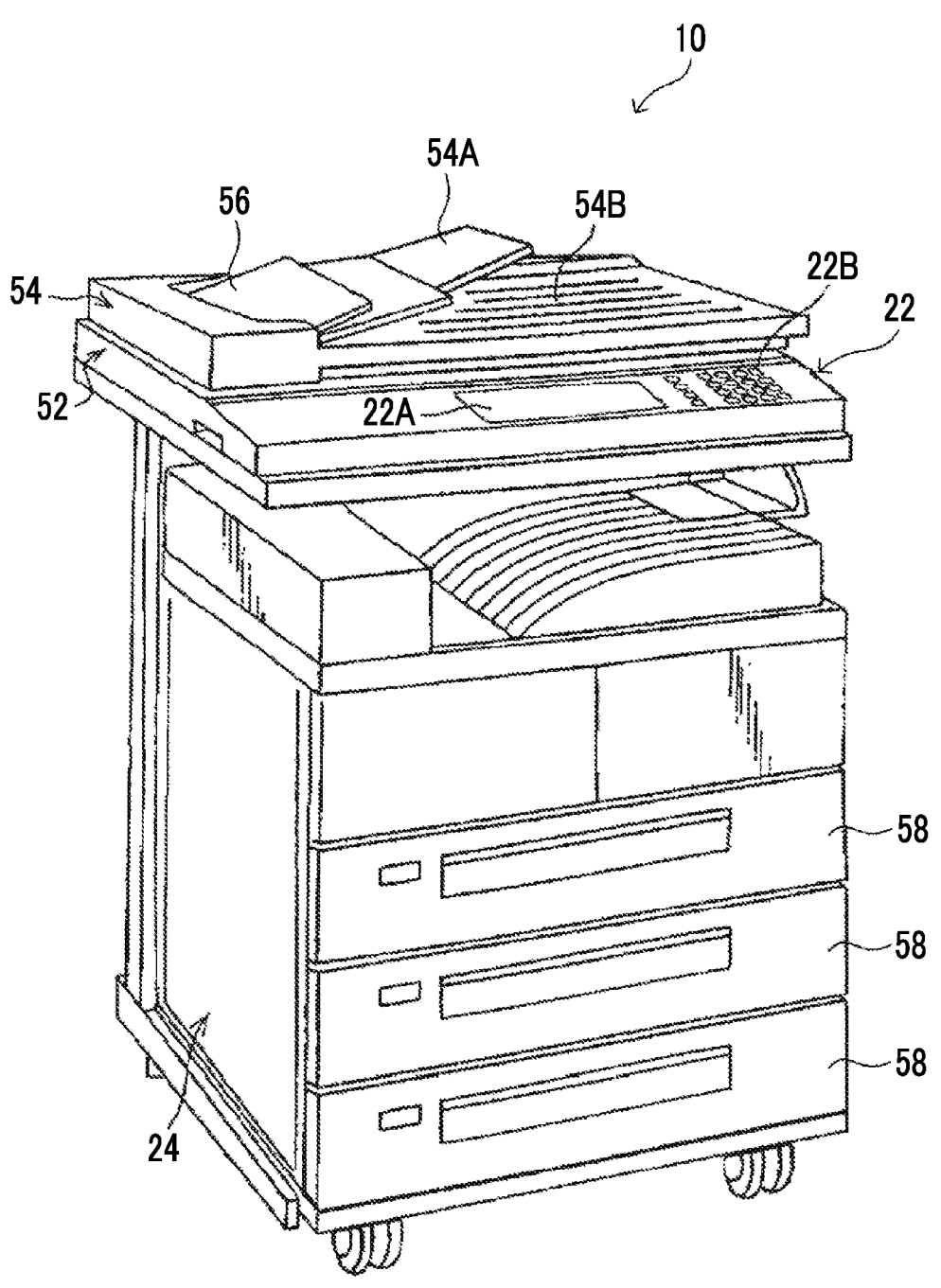
FIG. 1 is a perspective view showing an appearance of an image forming apparatus according to the present exemplary embodiment.

Hereinafter, an example of an exemplary embodiment of the present invention will be described in detail with reference to the drawings. Further, in the present exemplary embodiment, an image forming apparatus will be described as an example of an image processing apparatus. FIG. 1 is a perspective view showing an appearance of an image forming apparatus 10 according to the present exemplary embodiment. The image forming apparatus 10 according to the present exemplary embodiment has a print function of receiving various types of data via a communication line such as a network and performing image forming processing based on the received data. Further, the image forming apparatus 10 according to the present exemplary embodiment has a plurality of functions such as a scanning function of scanning a document to obtain image information representing the document, a copying function of copying an image recorded on the document on paper, a facsimile function of transmitting/receiving various types of data via a telephone line (not shown), a transfer function of transferring document information such as image information scanned by a scanning function or the like, an accumulating function of accumulating document information such as scanned image information, and the like.

In addition, the image forming apparatus 10 according to the present exemplary embodiment includes a document scanning unit 52 at an upper portion of the apparatus, and an image forming unit 24 is arranged below the document scanning unit 52. The document scanning unit 52 includes a document transport unit (not shown) in a document cover 54. The document transport unit draws documents 56 placed on a document feeding unit 54A provided on the document cover 54 in order and transports the documents 56 onto a platen glass (not shown) to scan an image recorded on the document 56. In addition, the document transport unit discharges the document 56, for which the scanning of the image has been ended, onto a document discharge unit 54B provided on the document cover 54.

Further, the document scanning unit 52 is provided with a user interface 22 that receives various instruction operations from a user. The user interface 22 is provided with a display button that achieves reception of an instruction operation via a software program, a display 22A on which various types of information are displayed, a hardware key 22B such as a numeric keypad, and the like. As the display 22A, a touch panel type display in which a display device such as a liquid crystal panel and a position input device such as a touch pad are combined is applied. The user interface 22 is used as a display button of the display 22A, a setting of the number of copies to be made and a magnification setting when the copying function is used by the hardware key 22B, a dial key of a telephone when the facsimile function is used, and the like. The hardware key 22B may be omitted.

On the other hand, the image forming unit 24 includes a paper feed storage unit 58 in which paper that severs as a recording medium for image formation is accommodated. The image forming unit 24 takes out the sheets of paper accommodated in the paper feed storage unit 58 one by one, and forms an image based on the image data on the paper through, for example, an electrophotographic process. In addition, the image forming unit 24 sequentially discharges the pieces of paper on which the image is formed onto a paper discharge unit (not shown).

Figure 2:
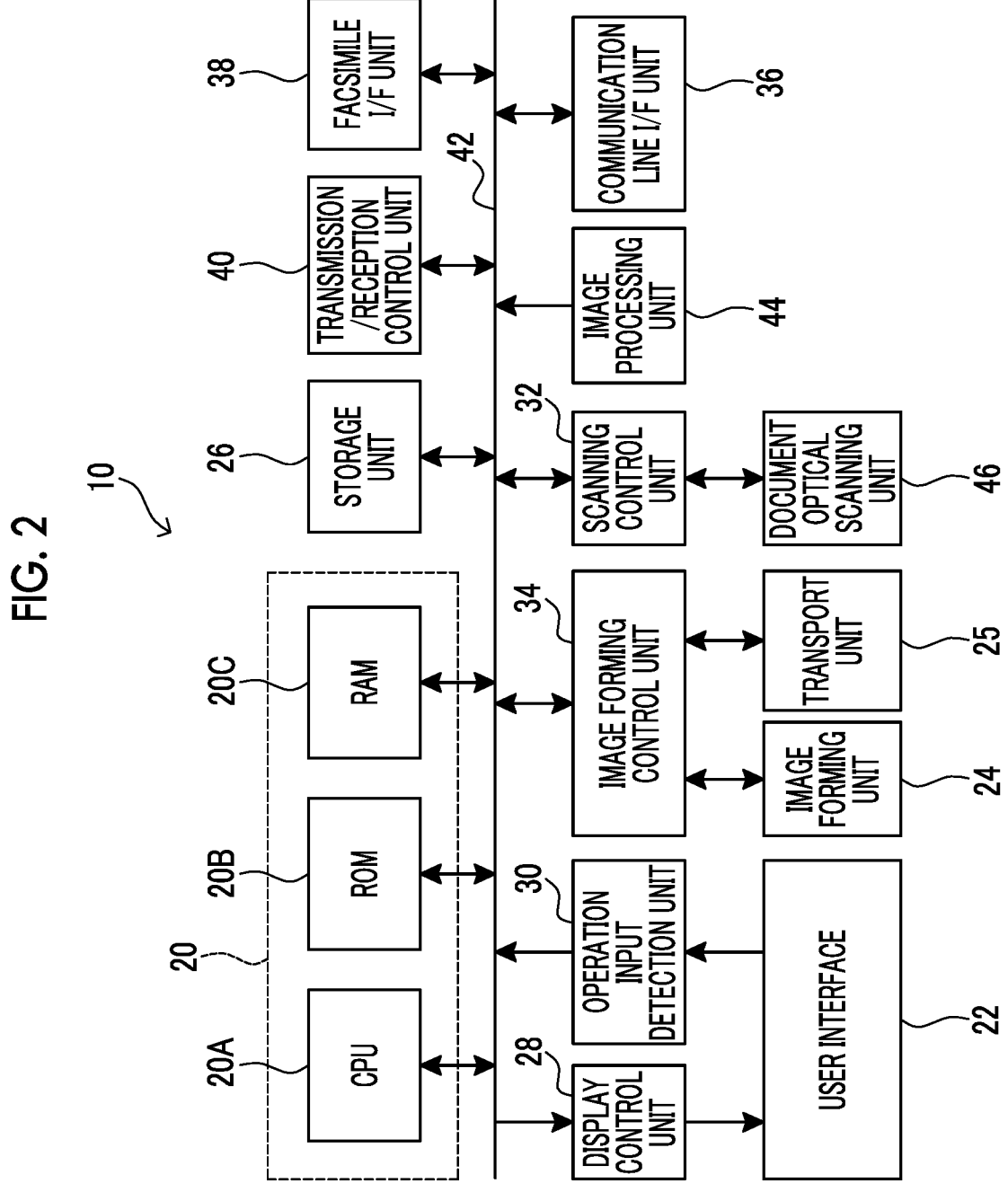
FIG. 2 is a block diagram showing a configuration of a principal part of an electrical system of the image forming apparatus according to the present exemplary embodiment.

FIG. 2 is a block diagram showing a configuration of a principal part of an electrical system of the image forming apparatus 10 according to the present exemplary embodiment.

As shown in FIG. 2, the image forming apparatus 10 according to the present exemplary embodiment includes a control unit 20 including a central processing unit (CPU) 20A, a read only memory (ROM) 20B, and a random access memory (RAM) 20C. The CPU 20A controls the overall operation of the image forming apparatus 10. The RAM 20C is used as a work area or the like when executing various programs by the CPU 20A. Various control programs such as an image processing program, various parameters, and the like, are stored in advance in the ROM 20B. In the image forming apparatus 10, each unit of the control unit 20 is electrically connected via a system bus 42.

On the other hand, the image forming apparatus 10 according to the present exemplary embodiment includes a storage unit 26 that stores various types of data, application programs, and the like. Further, the image forming apparatus 10 includes a display control unit 28 that is connected to a user interface 22 and controls the display of various operation screens and the like on a display 22A of the user interface 22. Further, the image forming apparatus 10 includes an operation input detection unit 30 that is connected to the user interface 22 and detects an operation instruction input via the user interface 22. Also, in the image forming apparatus 10, the storage unit 26, the display control unit 28, and the operation input detection unit 30 are electrically connected to the system bus 42. As an example, a hard disk drive (HDD) may be applied to the storage unit 26, or a nonvolatile storage unit such as a flash memory may be applied.

Further, the image forming apparatus 10 according to the present exemplary embodiment includes a scanning control unit 32 that controls an optical image scanning operation by a document optical scanning unit 46 and a document feeding operation by a document transport unit, and an image forming control unit 34 that controls image forming processing by an image forming unit 24 and the transport of paper to the image forming unit 24 via a transport unit 25. Further, the image forming apparatus 10 includes a communication line interface (I/F) unit 36 that is connected to a communication line (not shown) and transmits/receives communication data to/from another external device such as a server connected to the communication line, and an image processing unit 44 that performs various types of image processing. Further, the image forming apparatus 10 includes a facsimile interface (I/F) unit 38 that is connected to a telephone line (not shown) and transmits/receives facsimile data to/from a facsimile device connected to the telephone line. Further, the image forming apparatus 10 includes a transmission/reception control unit 40 that controls transmission/reception of facsimile data via the facsimile OF unit 38. In the image forming apparatus 10, the transmission/reception control unit 40, the scanning control unit 32, the image forming control unit 34, the communication line OF unit 36, the facsimile OF unit 38, and the image processing unit 44 are electrically connected to the system bus 42.

With the above configuration, the image forming apparatus 10 according to the present exemplary embodiment uses the CPU 20A to access the RAM 20C, the ROM 20B, and the storage unit 26. Further, the image forming apparatus 10 uses the CPU 20A to control the display of an operation screen and information such as various messages on the display 22A of the user interface 22 via the display control unit 28. Further, the image forming apparatus 10 uses the CPU 20A to control the operation of the document optical scanning unit 46 and the document transport unit via the scanning control unit 32. Further, the image forming apparatus 10 uses the CPU 20A to control the operation of the image forming unit 24 and the transport unit 25 via the image forming control unit 34 and to control the transmission/reception of communication data via the communication line OF unit 36. Further, the image forming apparatus 10 uses the CPU 20A to control the transmission/reception of facsimile data via the facsimile OF unit 38 by the transmission/reception control unit 40. Further, the image forming apparatus 10 uses the CPU 20A to ascertain the operation content in the user interface 22 based on the operation information detected by the operation input detection unit 30, and to execute various controls based on the operation content.

The image forming apparatus 10 according to the present exemplary embodiment configured as described above has an ID card copying function of copying documents such as an ID card by arranging both front and back sides on one sheet of paper.

In the ID card copying function in the related art, a plurality of card-sized documents are read once in one job, and after the final document has been confirmed, the arrangement of the documents on the paper is decided. At this time, in the image forming apparatus in the related art, in a case where adjacent documents in the order can be arranged in the horizontal direction with the same size, the documents are arranged in the horizontal direction of the paper, and in other cases, the documents are arranged in the vertical direction of the paper. In a case where the document does not fit on one page of the paper in determining the arrangement of the document, the document is arranged on the second and subsequent pages according to the same rule.

Figure 3:
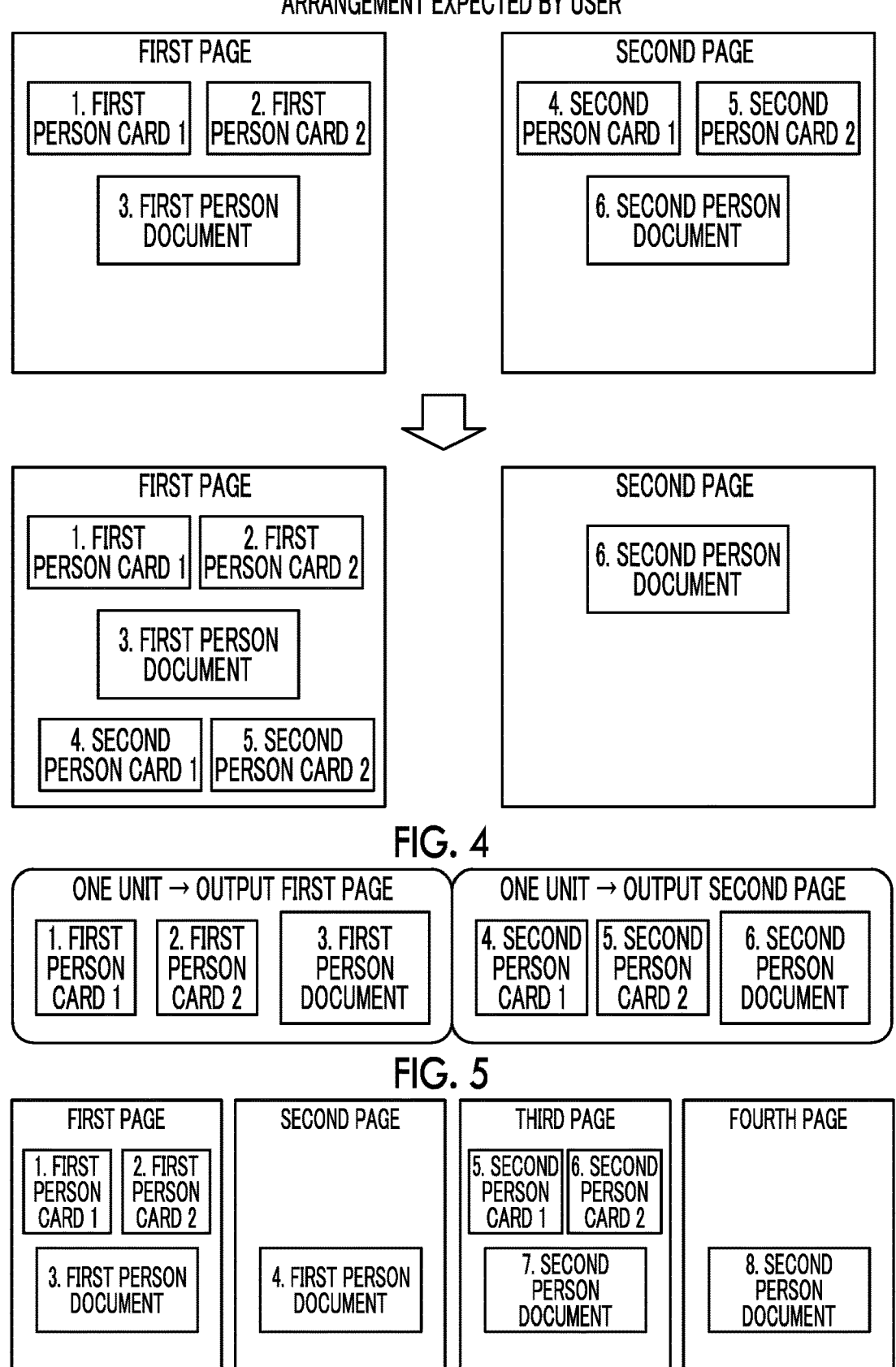
FIG. 3 is a diagram illustrating an example of an arrangement expected by a user and an arrangement in which scanned documents are arranged to fit an image as much as possible on one page.

However, in the ID card copying function in the related art, there is a case that the arrangement expected by the user is not obtained in one job. For example, in a case where there is a repetition cycle in the size of a document and it is intended to output one repetition cycle as one unit, the expected arrangement is not obtained in a case where the document images that can be arranged on one page are arranged. Specifically, as shown in FIG. 3, in a case where the user expects to arrange six cards for two people on one page for each user, in the related art, six documents are scanned one by one in one job, and as shown in the lower part of FIG. 3, the scanned documents are arranged to fit an image as much as possible on one page. In this case, unless the user divides the job into two jobs, the arrangement expected by the user shown in the upper part of FIG. 3 could not be obtained. In the present disclosure, a job refers to a process or a set of processes executed by the image forming apparatus 10 in order to achieve a predetermined function.

Therefore, in the image forming apparatus 10 according to the present exemplary embodiment, the CPU 20A is configured to acquire a document image sequence including a plurality of document images obtained by scanning a plurality of documents, and arrange and output a document image on each page such that the document image is a boundary of pages matched to a repetition cycle of a document size in a case where there is the repetition cycle in the acquired document image sequence.

Specifically, as shown in FIG. 4, in a case where, in a document image group after the number of sheets is confirmed, the repetition of a specific size pattern is detected, and the repetition is performed, the repetition is regarded as one unit, and the documents are arranged and output to fit on one page. In a case where the number of document images for one cycle does not fit on one page, the document images are continuously arranged on the second and subsequent pages as shown in FIG. 5. Then, the document image for the next cycle is arranged and output from a new page next to the page on which the last document image for the previous cycle is arranged. That is, even though there is a space for arranging the document image included in one unit of the next cycle on the page on which the document image included in one unit is arranged, the document image included in one unit of the next cycle is arranged on a new page. Thus, the arrangement expected by the user is achieved in one job, and there is no need to divide the job into two jobs.

Figure 6:
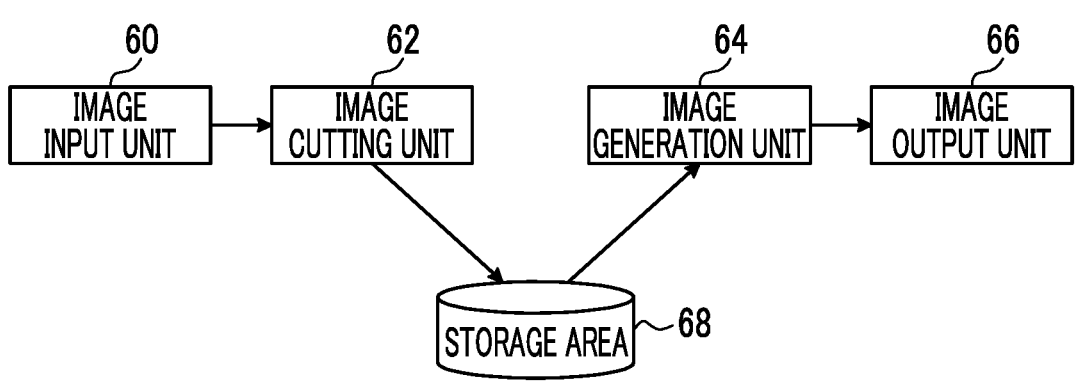
FIG. 6 is a functional block diagram showing a functional configuration of a control unit of the image forming apparatus according to the present exemplary embodiment.

In order to perform such processing, in the present exemplary embodiment, the CPU 20A of the control unit 20 loads the program stored in the ROM 20B into the RAM 20C and executes the program, thereby having a function shown in FIG. 6. FIG. 6 is a functional block diagram showing a functional configuration of the control unit 20 of the image forming apparatus 10 according to the present exemplary embodiment.

The control unit 20 has functions of an image input unit 60, an image cutting unit 62, an image generation unit 64, an image output unit 66, and a storage area 68. In the present exemplary embodiment, the functional configuration of FIG. 6 will be described as a function of the control unit 20, but the present disclosure is not limited thereto, and the functional configuration of FIG. 6 may be used as the functional configuration of the image processing unit 44, for example.

The image input unit 60 controls the operations of the document optical scanning unit 46 and the document transport unit via the scanning control unit 32 to scan a document arranged in a scanning area of the document scanning unit 52.

The image cutting unit 62 extracts only the document portion from the area scanned by the image input unit 60 to generate a document image, and stores the generated document image in the storage area 68.

The image generation unit 64 decides the layout from several document image groups stored in the storage area 68, and generates an output image.

The image output unit 66 controls the operations of the image forming unit 24 and the transport unit 25 via the image forming control unit 34 to form an output image generated by the image generation unit 64 on paper.

The storage area 68 holds, in a predetermined area of the storage unit 26, a document image generated by the image cutting unit 62 in order to scan the document a plurality of times in one job.

It is assumed that the document image group includes a small-sized atypical document such as an ID card in the document image, that the top of the document image group is all directed upward, that there are two or more document images, and that the sizes of the document images have periodicity.

Specifically, in a case of deciding the layout, the image generation unit 64 has a detection target image sequence construction function of determining whether or not the vertical width and the horizontal width of the two document images have the same size, and a detection function of detecting a repetition pattern of the document image sequence.

Figure 7:
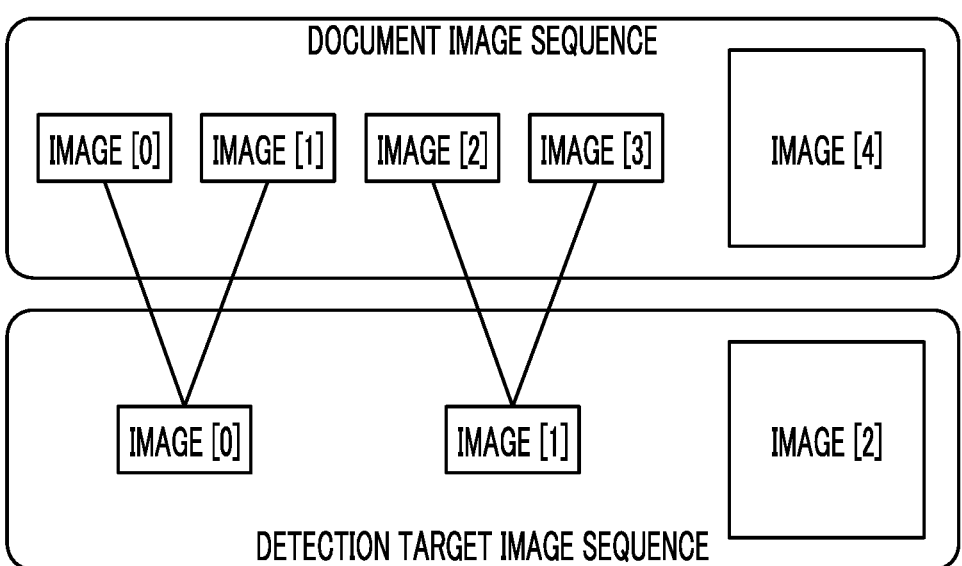
FIG. 7 is a diagram illustrating a detection target image sequence construction function.

In the detection target image sequence construction function, images that can be regarded as images of the same size are set as one set from the vertical width and the horizontal width of the document image sequence, and a detection target image sequence serving as a target for detecting a repetition pattern is constructed in advance. For example, as shown in FIG. 7, assuming that the document image sequence is an image [0] to an image [4], where the sizes of the image [0] to the image [3] are equal to each other, the image [0] and the image [1], the image [2] and the image [3] are each set as one set, and a detection target image sequence of the image [0] to the image [2] is constructed. Thus, the number of target images in detecting the repetition cycle of the size of the image is reduced, and the processing load is reduced. The construction of the detection target image sequence may be repeated until the adjacent images have different sizes. That is, in the example of FIG. 7, in a case where the sizes of the image [0] and the image [1] of the detection target image sequence are equal to each other, the two images may be further regarded as one set to construct a new detection target image sequence. Further, the present exemplary embodiment has been described as having the detection target image sequence construction function, but the detection target image sequence construction function may be omitted.

Further, in the detection function, the size of the document image is calculated for the detection target image sequence, and one repetition cycle and the number of repetitions of the detection target image sequence are obtained based on the calculation result.

Here, in a case where the repetition is requested, the number of sheets of the document image group per cycle is calculated based on the boundary of the repetition, and the layout is determined so that the boundary of the cycle becomes the boundary of the pages. In calculating the number of sheets per cycle, the number of sheets per cycle is calculated in consideration of the document images regarded as one set by the detection target image sequence construction function.

In a case where the document image for one cycle cannot be fit within one page, the document image is arranged on the second and subsequent pages. At this time, the arrangement of the document image for the next cycle starts from a new page.

Figure 8:
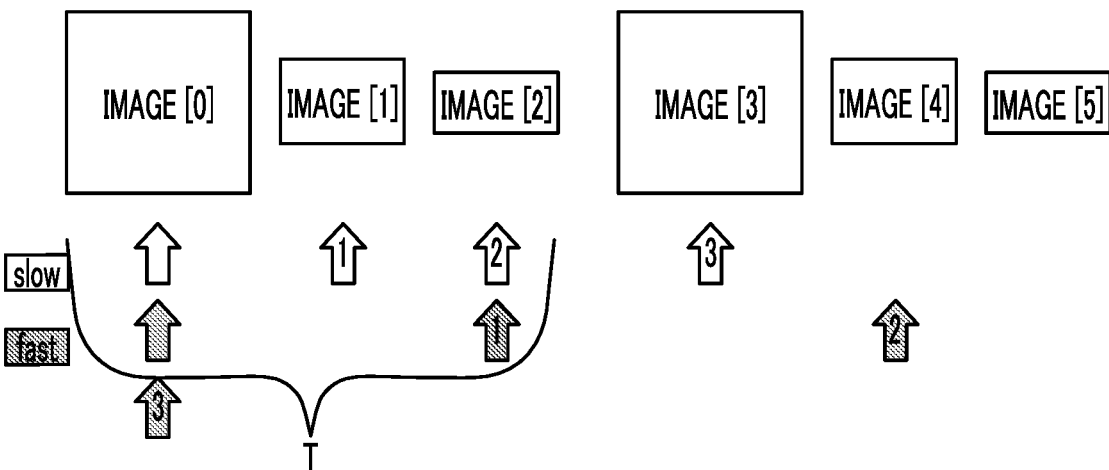
FIG. 8 is a diagram illustrating a method of detecting a repetition pattern.

Here, a method of detecting the repetition pattern by the detection function of the image generation unit 64 will be described in detail. In the present exemplary embodiment, the repetition pattern of the document image sequence is detected by using the Floyd's cycle-finding algorithm. FIG. 8 is a diagram illustrating a method of detecting a repetition pattern.

For example, as shown in FIG. 8, a document image sequence consisting of 6 images of the image [0] to the image [5] will be described as an example.

As shown in FIG. 8, slow and fast are used as indexes of M images, and each time slow advances by one from the image [0], fast advances by two from the image [0]. In a case where fast is M or more (fast>=M), the remainder obtained by dividing fast by M is defined as fast (fast=fast % M).

The size of the image is compared while advancing the index, and in a case where the image [slow] and the image [fast] match at the same size, the repetition cycle is obtained by setting the image [0] to the image [slow−1] as one repetition cycle T.

Figure 9:
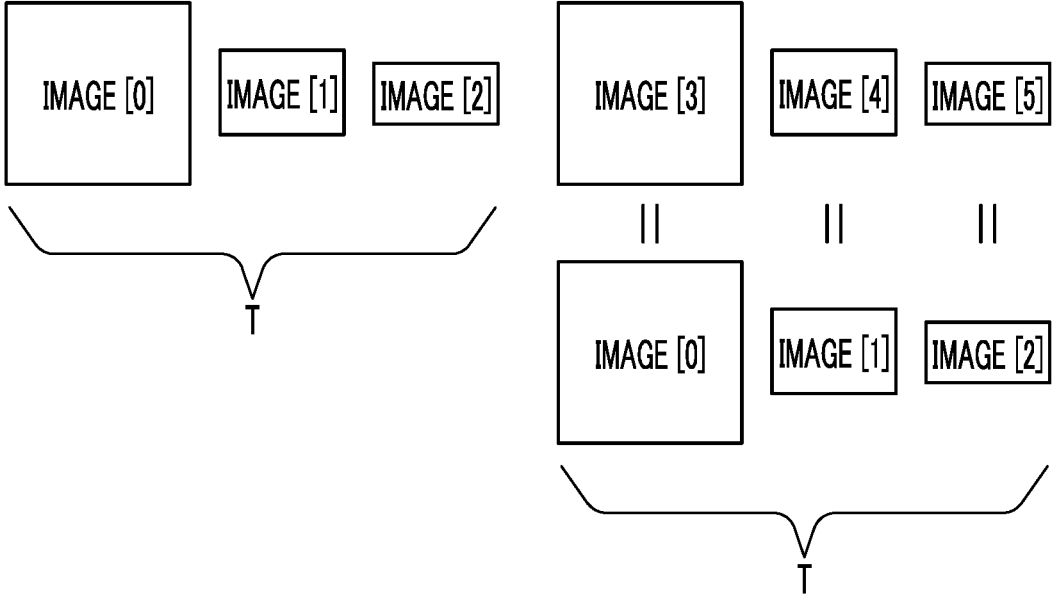
FIG. 9 is a diagram illustrating a method of detecting a number of repetitions.

Subsequently, a method of detecting the number of repetitions by the detection function of the image generation unit 64 will be described. FIG. 9 is a diagram illustrating a method of detecting a number of repetitions.

As shown in FIG. 9, the sizes of the image [0] to the image [2] included in the detected one cycle are compared with the image [3] to the image [5] corresponding to the next cycle, respectively.

Then, in a case where the sizes of the respective images are the same, the number of repetitions (initial value 1) is added, and the number of repetitions is detected by repeating until there is no image corresponding to the next cycle.

Subsequently, a procedure in a case where a user performs an ID card copy job in the image forming apparatus 10 according to the present exemplary embodiment configured as described above will be described.

First, the user places one document in the scanning area of the document scanning unit 52 with the top facing up, and operates the user interface 22 to select an ID card copy job.

The user operates the user interface 22 to set the job, and then issues an instruction to start the ID card copy job.

Upon receiving the start instruction, the image forming apparatus 10 scans the document and holds the document image obtained by cutting out the image portion of the document in the storage area 68.

In a case where the user selects the presence or absence of the next document and the presence of the next document is selected, the user places one next document on the document scanning unit 52 with the top facing up, and operates the user interface 22 to select the presence of the next document, and thereby the image forming apparatus 10 scans the document as described above and holds the document image in the storage area 68.

In a case where no next document is selected or the image forming apparatus 10 scans the maximum number of documents defined in advance in the ID card copy job, the following main process is executed to decide the layout and output the generated image.

Figure 10:
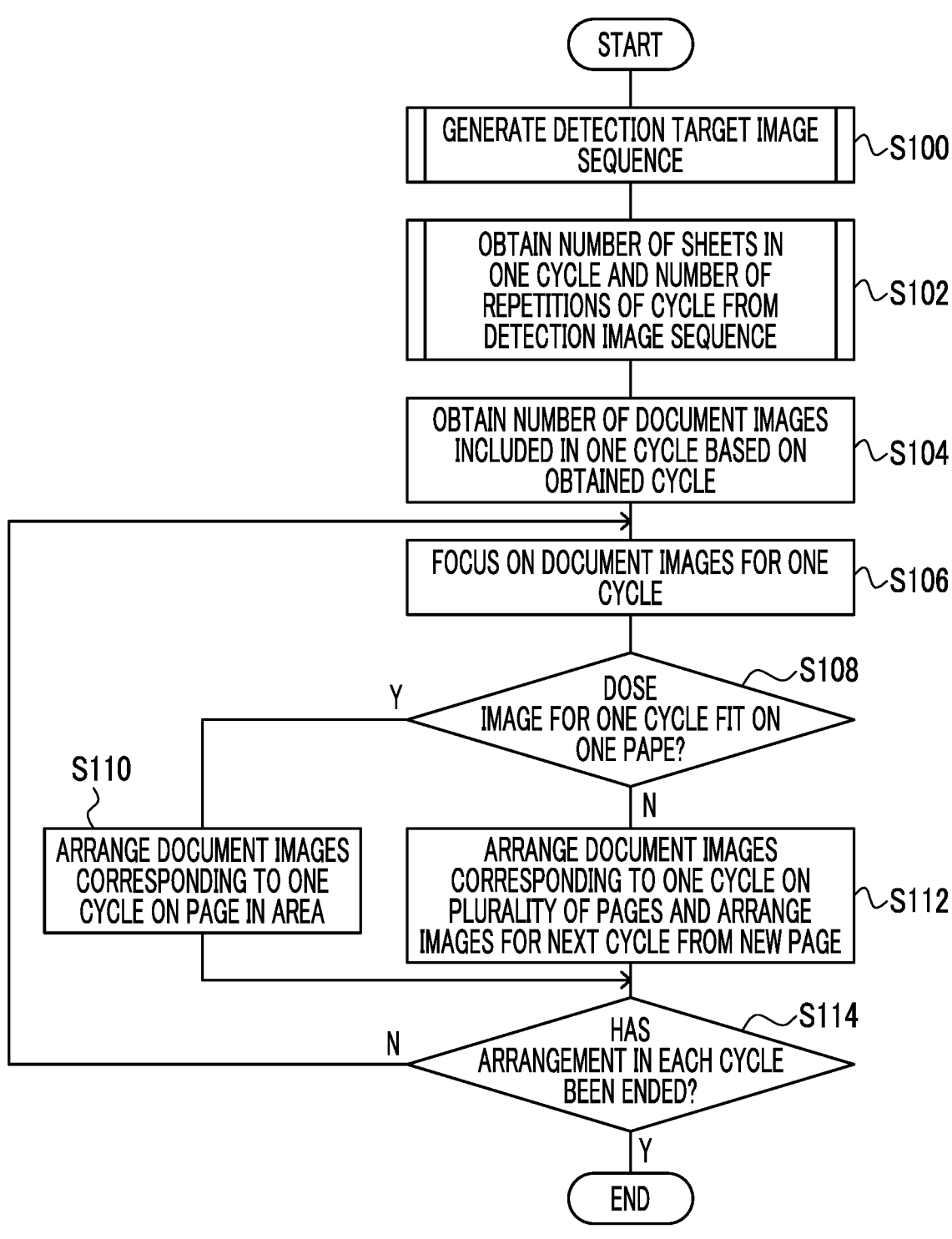
FIG. 10 is a flowchart showing an example of a flow of a main process performed by the image forming apparatus according to the present exemplary embodiment.

Here, details of the main process performed by the image forming apparatus 10 will be described. FIG. 10 is a flowchart showing an example of a flow of a main process performed by the image forming apparatus 10 according to the present exemplary embodiment. The process of FIG. 10 is started in a case where the ID card copy job is selected and the start instruction is issued. In addition, in the process of FIG. 10, a document image sequence composed of N images is input, and an arrangement result of the document image sequence is output.

Figure 11:
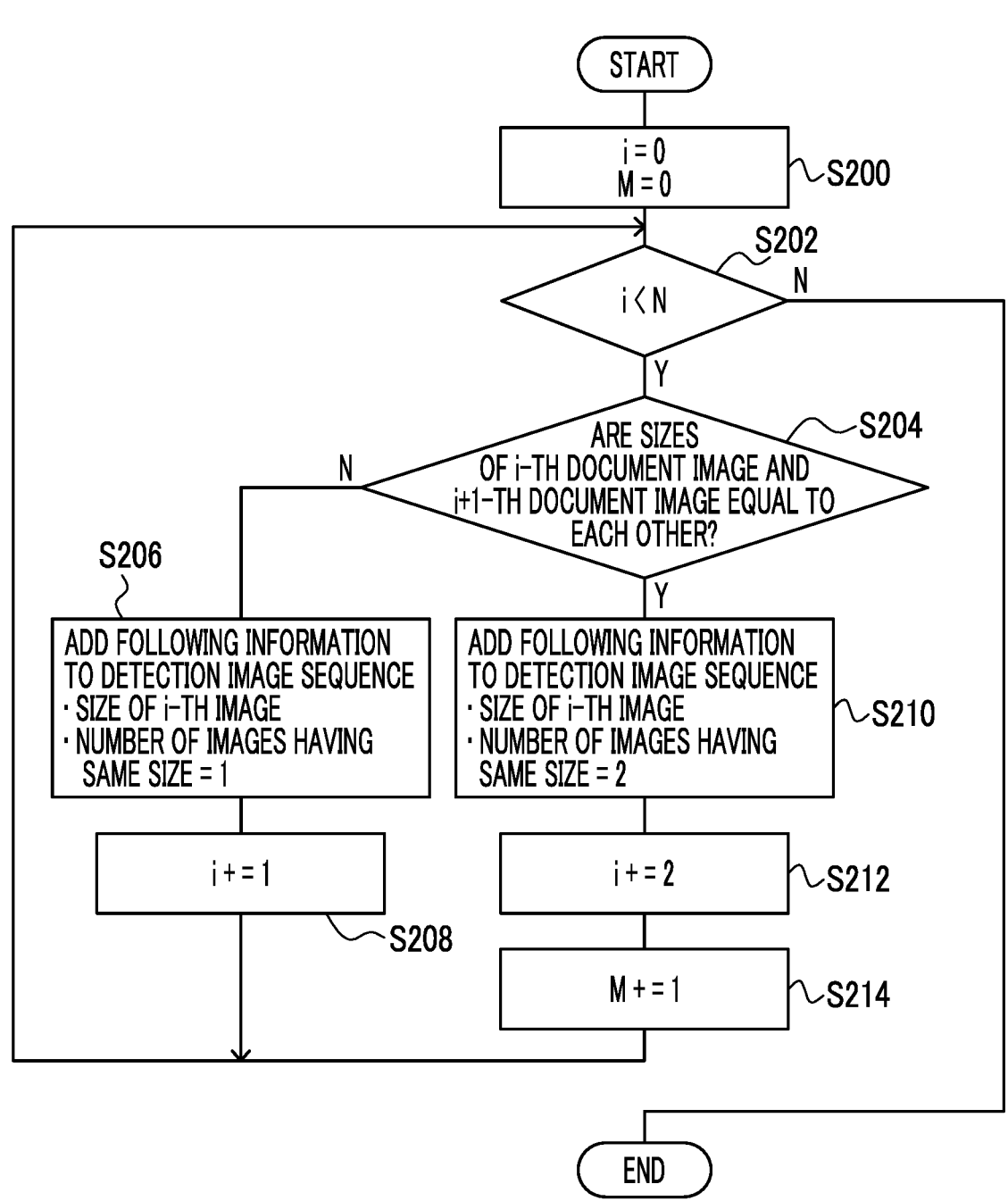
FIG. 11 is a flowchart showing an example of a flow of a process of generating a detection target image sequence.

In step S100, the CPU 20A performs a process of generating the detection target image sequence, and proceeds to step S102. In this process, by the detection target image sequence construction function of the image generation unit 64, images that can be regarded as images of the same size are set as one set from the document image sequence, and a detection target image sequence serving as a target for detecting a repetition pattern is constructed. Specifically, a process shown in FIG. 11 is performed. Here, a process of generating a detection target image sequence will be described with reference to FIG. 11. FIG. 11 is a flowchart showing an example of a flow of a process of generating a detection target image sequence. In the process of FIG. 11, a description will be made on the assumption that a document image sequence composed of N documents is input, and a detection target image sequence having M images is output.

In step S200, the CPU 20A proceeds to step S202 with i=0 and M=0.

In step S202, the CPU 20A determines whether or not i<N. In a case where the determination is affirmative, the process proceeds to step S204.

In step S204, the CPU 20A determines whether or not the sizes of the i-th document image and the i+1-th document image are equal to each other. In a case where the determination is negative, the process proceeds to step S206, and in a case where the determination is affirmative, the process proceeds to step S210.

In step S206, the CPU 20A adds information indicating the size of the i-th image and the number of images of the same size=1 to the detection image sequence, and proceeds to step S208.

In step S208, the CPU 20A increments i by one (i+=1), returns to step S202, and repeats the above process.

On the other hand, in step S210, the CPU 20A adds information indicating the size of the i-th image and the number of images of the same size=2 to the detection image sequence, and proceeds to step S212.

In step S212, the CPU 20A increments i by 2 (i+=2) and proceeds to step S214.

In step S214, the CPU 20A increments M by 1 (M+=1), returns to step S202, and repeats the above process.

Also, in a case where the determination in step S202 is negative, the process is ended as it is, and the process proceeds to step S102 in FIG. 10.

Figure 12:
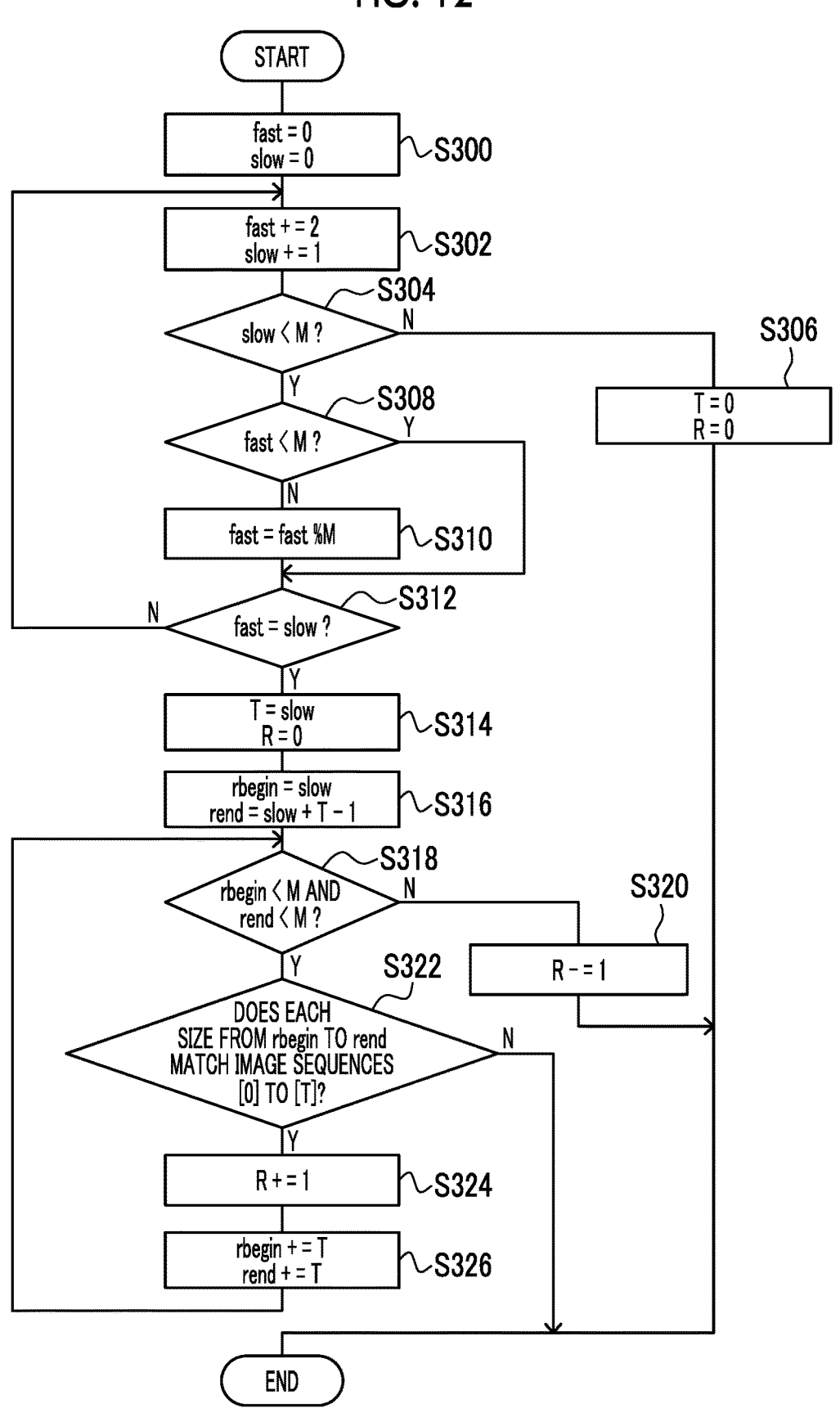
FIG. 12 is a flowchart showing an example of a flow of processing for obtaining the number of sheets in one cycle and the number of repetitions of the cycle from a detection image sequence.

In step S102, the CPU 20A performs a process of obtaining the number of sheets in one cycle and the number of repetitions of the cycle from the detection image sequence, and proceeds to step S104. In this process, by the detection function of the image generation unit 64, the size of the document image is calculated for the detection target image sequence, and one repetition cycle and the number of repetitions of the detection target image sequence are obtained based on the calculation result. Specifically, a process shown in FIG. 12 is performed. Here, a process of obtaining the number of sheets in one cycle and the number of repetitions of the cycle from the detection image sequence will be described with reference to FIG. 12. FIG. 12 is a flowchart showing an example of a flow of processing for obtaining the number of sheets in one cycle and the number of repetitions of the cycle from a detection image sequence. In the process of FIG. 12, a description will be made on the assumption that a detection target image sequence having M images is input, and the number of sheets T in one cycle and the number of repetitions R of the cycle are output.

In step S300, the CPU 20A proceeds to step S302 with fast=0 and slow=0.

In step S302, the CPU 20A increments fast by 2 (fast+=2) and increments slow by 1 (slow+=1), and proceeds to step S304.

In step S304, the CPU 20A determines whether or not slow <M. In a case where the determination is negative, the process proceeds to step S306, and in a case where the determination is affirmative, the process proceeds to step S308.

In step S306, the CPU 20A sets T=0 and R=0, ends the process, and proceeds to step S104 in FIG. 10.

On the other hand, in step S308, the CPU 20A determines whether or not fast <M. In a case where the determination is negative, the process proceeds to step S310, and in a case where the determination is affirmative, the process proceeds to step S312.

In step S310, the CPU 20A proceeds to step S312 with the remainder obtained by dividing the fast by M as fast (fast=fast % M).

In step S312, the CPU 20A determines whether or not detection target image sequence [fast] and the detection target image sequence [slow] have the same size (fast=slow). In a case where the determination is negative, the process returns to step S302 and the above process is repeated, and in a case where the determination is affirmative, the process proceeds to step S314.

In step S314, the CPU 20A proceeds to step S316 with T=slow and R=0.

In step S316, the CPU 20A proceeds to step S318 with rbegin=slow and rend=slow+T−1.

In step S318, the CPU 20A determines whether or not rbegin<M and rend<M. In a case where the determination is negative, the process proceeds to step S320, and in a case where the determination is affirmative, the process proceeds to step S322.

In step S320, the CPU 20A subtracts 1 from R (R−=1), ends the process, and proceeds to step S104 in FIG. 10.

On the other hand, in step S322, the CPU 20A determines whether or not each size from rbegin to rend matches the images [0] to [T]. In a case where the determination is affirmative, the process proceeds to step S324, and in a case where the determination is negative, the process ends and the process proceeds to step S104 in FIG. 10.

In step S324, the CPU 20A increments R by 1 (R+=1) and proceeds to step S326. In step S326, the CPU 20A increments rbegin by T (rbegin+=T) and increments rend by T (rend+=T), returns to step S318, and repeats the above process.

On the other hand, referring back to FIG. 10, in step S106, the CPU 20A focuses on the document image for one cycle and proceeds to step S108.

In step S108, it is determined whether or not the image for one cycle fits on one page. In a case where the determination is affirmative, the process proceeds to step S110, and in a case where the determination is negative, the process proceeds to step S112.

In step S110, the CPU 20A arranges the document images corresponding to one cycle on one page in the area and proceeds to step S114.

In step S112, the CPU 20A arranges the document images corresponding to one cycle on a plurality of pages, arranges the images for the next cycle from the new page, and proceeds to step S114.

In step S114, the CPU 20A determines whether or not the arrangement of the document images in each cycle has been ended. In a case where the determination is negative, the process returns to step S106 and repeats the above process while focusing on the document images for the next one cycle, and in a case where the determination is affirmative, a series of main processes is ended.

Figure 13:
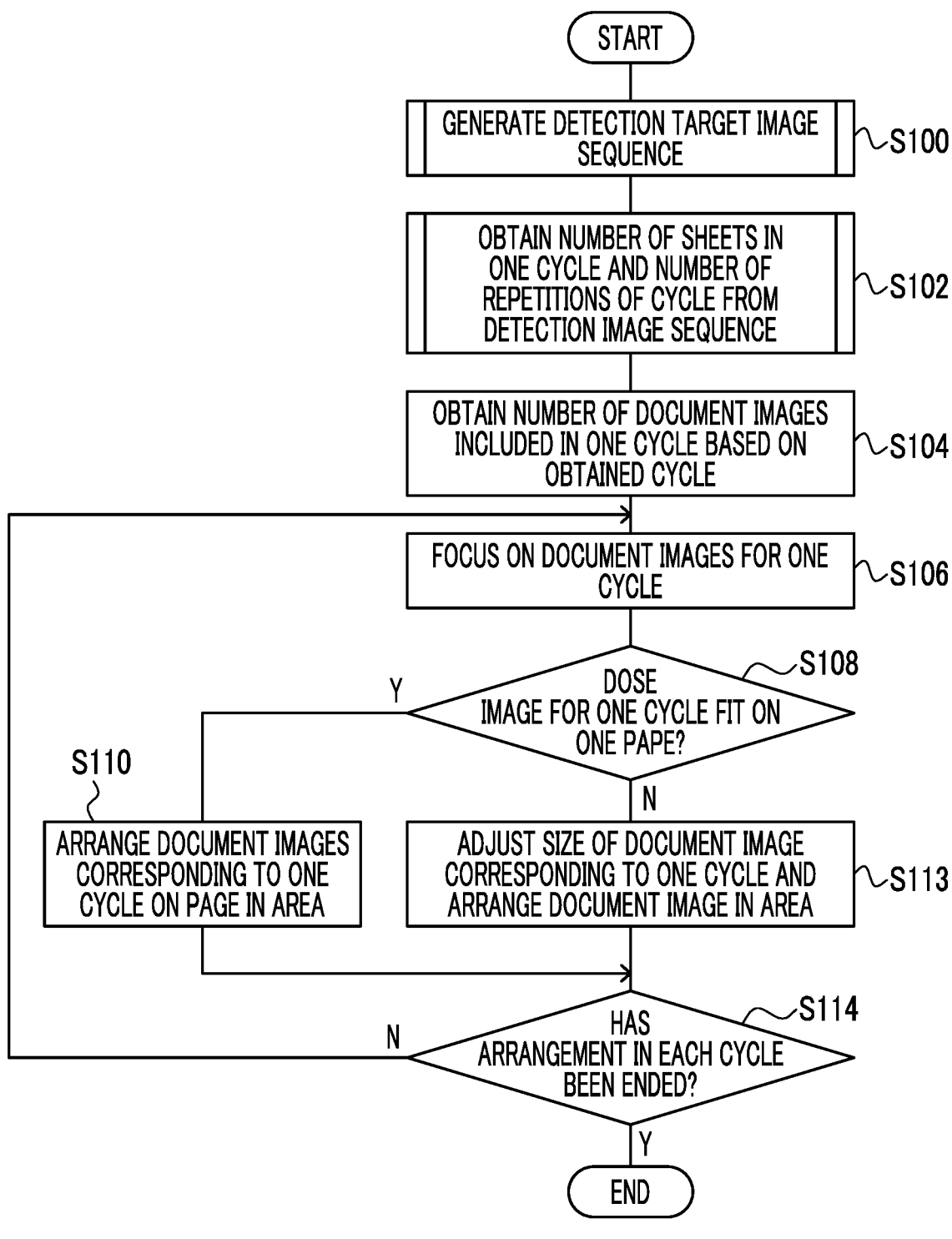
FIG. 13 is a flowchart showing an example of a flow of a first modification example of the main process performed by the image forming apparatus according to the present exemplary embodiment.

In the above exemplary embodiment, in a case where the number of document images for one cycle does not fit on one page, the document images are continuously arranged on the second and subsequent pages, but the present disclosure is not limited thereto. For example, the size of the document image may be adjusted and arranged so that the document image fits on one page. In the main process in this case, as shown in FIG. 13, step S113 is performed instead of step S112 in FIG. 10. That is, in step S113, the size of the document image corresponding to one cycle is adjusted to fit within one page, the document image is arranged in the area, and the process proceeds to step S114. Further, in this case, a threshold value of the size can be set in advance, and in adjusting the size of the document image, in a case where the adjusted size of the image is equal to or less than a preset threshold value, the image may be arranged on the next page without adjusting the size of the image.

Figure 14:
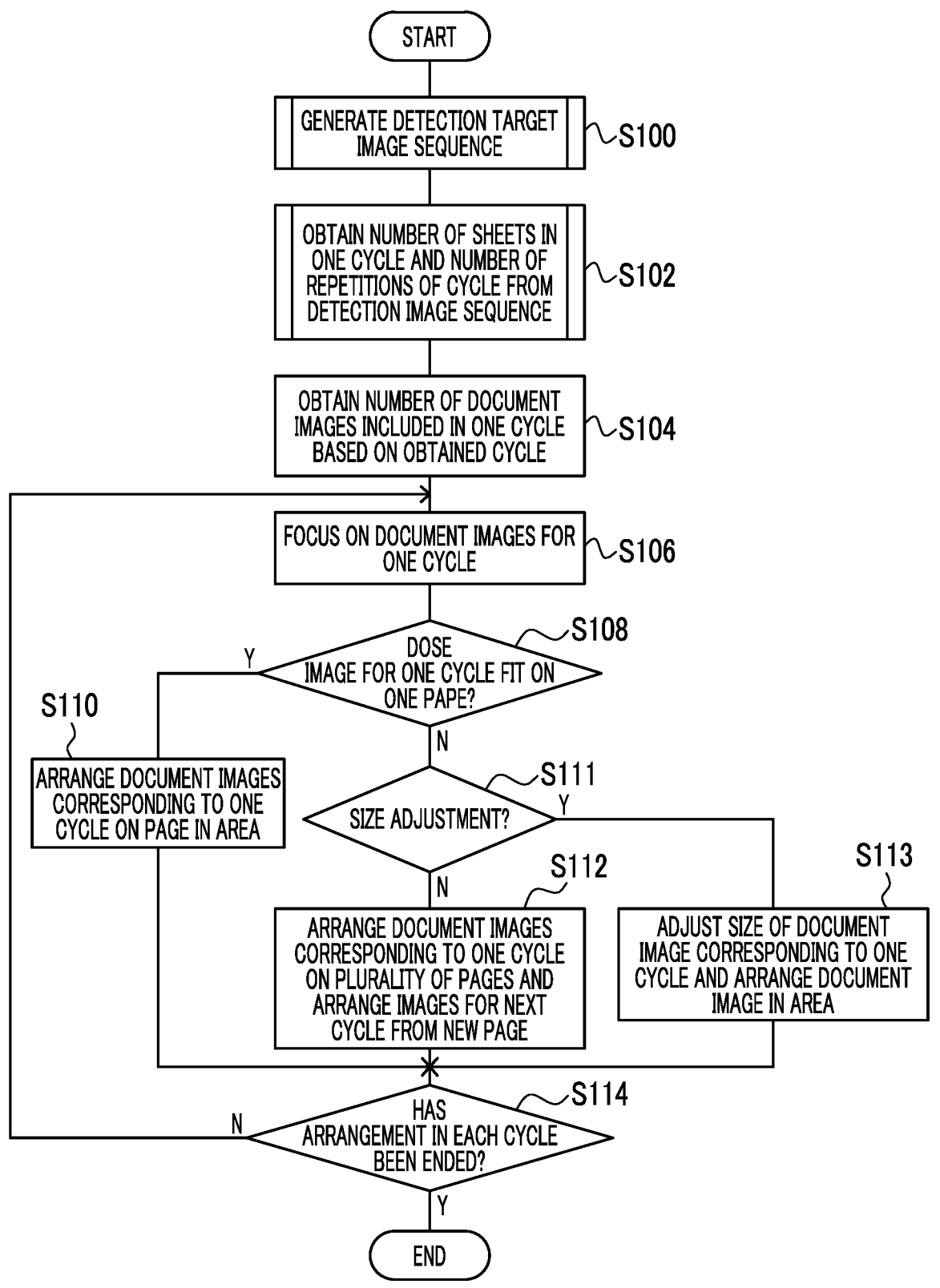
FIG. 14 is a flowchart showing an example of a flow of a second modification example of the main process performed by the image forming apparatus according to the present exemplary embodiment.

Alternatively, as a result of receiving from the user whether or not to adjust the size, in a case of adjusting the size, the size of the document image corresponding to one cycle may be adjusted to fit within one page, and the document image may be arranged in the area, and in a case of not adjusting the size, images for the next cycle may be arranged from a new page. In the main process in this case, as shown in FIG. 14, steps S111 and S113 are added to FIG. 10. That is, in a case where the determination in step S108 is negative, the process proceeds to step S111 to determine whether or not to adjust the size. The determination may be made, for example, by displaying a screen for inquiring about the user and receiving the selection result, or setting the determination in advance on a setting screen or the like. In a case where the determination is affirmative, the process proceeds to step S113 described above, and in a case where the determination is negative, the process proceeds to step S112 described above.

Figure 15:
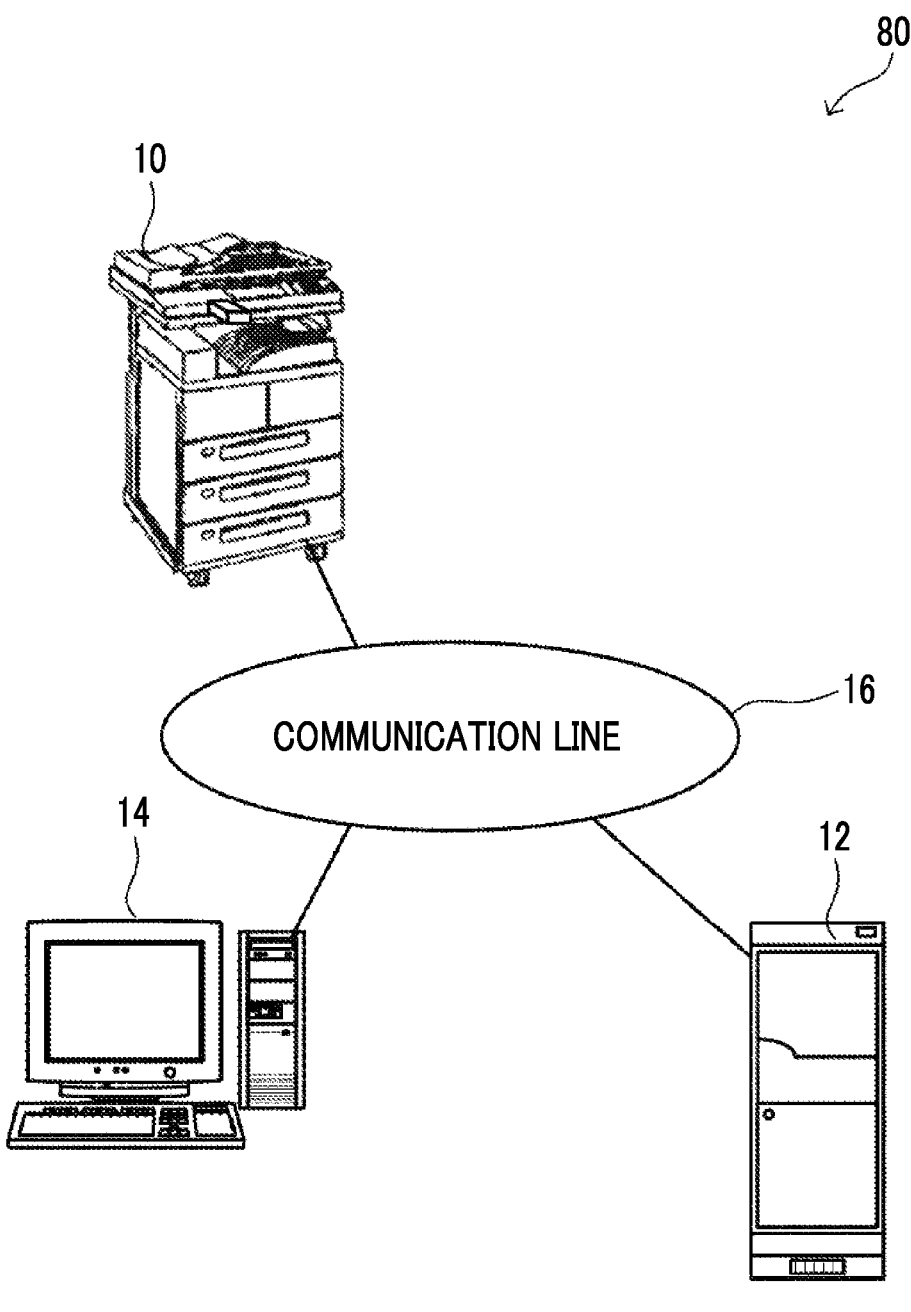
FIG. 15 is a diagram showing an example of an image processing system according to the present exemplary embodiment.

Further, in the above-described exemplary embodiment, the example in which the image forming apparatus 10 performs the processes of FIGS. 10 to 14 has been described, but the present disclosure is not limited thereto. For example, as shown in FIG. 15, an image processing system 80 in which the image forming apparatus 10 and at least one of a client computer 14 or a server 12 such as a cloud server are connected to a communication line 16 may be used. In this case, the image forming apparatus 10 may serve as an image scanning apparatus, the client computer 14 or the server 12 may serve as an image processing apparatus, the image forming apparatus 10 may scan a plurality of documents and generate a document image sequence including a plurality of document images, and the client computer 14 or the server 12 may perform the processes shown in FIGS. 10 to 12.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, the processing performed in the image forming apparatus 10 according to the above exemplary embodiment may be processing performed by software, processing performed by hardware, or processing in which both are combined. Also, the processing performed in the image forming apparatus 10 may be stored in a storage medium as a program and distributed.

Further, the present disclosure is not limited to the above description, and it is needless to say that the present disclosure can be variously modified and implemented within a range not deviating from the gist thereof.

As described above, in the present exemplary embodiment, the following supplementary notes are disclosed.

(((1)))

An image processing apparatus comprising:

a processor configured to:

acquire a document image sequence including a plurality of document images obtained by scanning a plurality of documents; and arrange and output a document image on each page such that the document image is a boundary of pages matched to a repetition cycle of a document size in a case where there is the repetition cycle in the document image sequence.

(((2)))

The image processing apparatus according to (((1))), wherein the processor is configured to: with one cycle of the repetition cycle as one unit, arrange the document image included in the one unit of a next cycle on a new page even though there is a space for arranging the document image included in the one unit of the next cycle on a page on which the document image included in the one unit is arranged.

(((3)))

The image processing apparatus according to (((1))), wherein the processor is configured to: adjust a size of the document image sequence to fit on one page with the repetition cycle as one unit and arrange the document image.

(((4)))

The image processing apparatus according to (((3))), wherein the processor is configured to: after receiving whether or not to adjust the size of the document image sequence:

in a case of adjusting the size of the document image sequence, adjust the size of the document image sequence to fit on one page with the repetition cycle as one unit and arrange the document image; and in a case of not adjusting the size of the document image sequence, with one cycle of the repetition cycle as one unit, arrange the document image included in the one unit of a next cycle on a new page even though there is a space for arranging the document image included in the one unit of the next cycle on a page on which the document image included in the one unit is arranged.

(((5)))

The image processing apparatus according to any one of (((1))) to (((4)), wherein the processor is configured to: generate a detection target image sequence by regarding, as one set, the document images in which a size of each of the document images in the document image sequence is regarded as having the same size, and detect a repetition cycle of a document size of the detection target image sequence.

(((6)))

The image processing apparatus according to (((5))), wherein the processor is configured to: calculate a size of the document image in the detection target image sequence, and obtain one repetition cycle and the number of repetitions of the detection target image sequence based on the calculated size.

(((7)))

The image processing apparatus according to (((6))), wherein the processor is configured to: in a case where there is the repetition cycle of the detection target image sequence, calculate the number of sheets per cycle of the document image sequence based on a boundary between repetitions, and arrange the document image so that a boundary of the cycle becomes the boundary of the pages.

(((8)))

An image processing system comprising:

an image scanning apparatus that scans a plurality of documents and generates a document image sequence including a plurality of document images; and the image processing apparatus according to any one of (((1))) to (((7))).

(((9)))

An image processing program causing a computer to execute a process comprising:

acquiring a document image sequence including a plurality of document images obtained by scanning a plurality of documents; and arranging and outputting a document image on each page such that the document image is a boundary of pages matched to a repetition cycle of a document size in a case where there is the repetition cycle in the document image sequence.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor configured to:
    acquire a document image sequence including a plurality of document images obtained by scanning a plurality of documents;
    detect, using an algorithm, a repetition pattern in which a specific document size pattern is repeated in the document image sequence and determine a repetition cycle based on the detected repetition pattern; and
    arrange and output a document image on each page such that the document image is a boundary of pages matched to the repetition cycle.

2. The image processing apparatus according to claim 1, wherein the processor is configured to: with one cycle of the repetition cycle as one unit, arrange the document image included in the one unit of a next cycle on a new page even though there is a space for arranging the document image included in the one unit of the next cycle on a page on which the document image included in the one unit is arranged.

3. The image processing apparatus according to claim 1, wherein the processor is configured to: adjust a size of the document image sequence to fit on one page with the repetition cycle as one unit and arrange the document image.

4. The image processing apparatus according to claim 3, wherein the processor is configured to: after receiving whether or not to adjust the size of the document image sequence:
    in a case of adjusting the size of the document image sequence, adjust the size of the document image sequence to fit on one page with the repetition cycle as one unit and arrange the document image; and
    in a case of not adjusting the size of the document image sequence, with one cycle of the repetition cycle as one unit, arrange the document image included in the one unit of a next cycle on a new page even though there is a space for arranging the document image included in the one unit of the next cycle on a page on which the document image included in the one unit is arranged.

5. The image processing apparatus according to claim 1, wherein the processor is configured to: generate a detection target image sequence by regarding, as one set, the document images in which a size of each of the document images in the document image sequence is regarded as having the same size, and detect a repetition cycle of a document size of the detection target image sequence.

6. The image processing apparatus according to claim 5, wherein the processor is configured to: calculate a size of the document image in the detection target image sequence, and obtain one repetition cycle and the number of repetitions of the detection target image sequence based on the calculated size.

7. The image processing apparatus according to claim 6, wherein the processor is configured to: in a case where there is the repetition cycle of the detection target image sequence, calculate the number of sheets per cycle of the document image sequence based on a boundary between repetitions, and arrange the document image so that a boundary of the cycle becomes the boundary of the pages.

8. An image processing system comprising:
an image scanning apparatus that scans a plurality of documents and generates a document image sequence including a plurality of document images; and
the image processing apparatus according to claim 1.

9. A non-transitory computer readable medium storing an image processing program causing a computer to execute a process comprising:
    acquiring a document image sequence including a plurality of document images obtained by scanning a plurality of documents;
    detecting, using an algorithm, a repetition pattern in which a specific document size pattern is repeated in the document image sequence and determining a repetition cycle based on the detected repetition pattern; and
    arranging and outputting a document image on each page such that the document image is a boundary of pages matched to the repetition cycle.

10. An image processing method comprising:
    acquiring a document image sequence including a plurality of document images obtained by scanning a plurality of documents;
    detecting, using an algorithm, a repetition pattern in which a specific document size pattern is repeated in the document image sequence and determining a repetition cycle based on the detected repetition pattern; and
    arranging and outputting a document image on each page such that the document image is a boundary of pages matched to the repetition cycle.

\* \* \* \* \*